G. E. HUMPHRIES.
SCAFFOLDING.
APPLICATION FILED FEB. 27, 1909.
Reissued Nov. 9, 1909. 13,036.
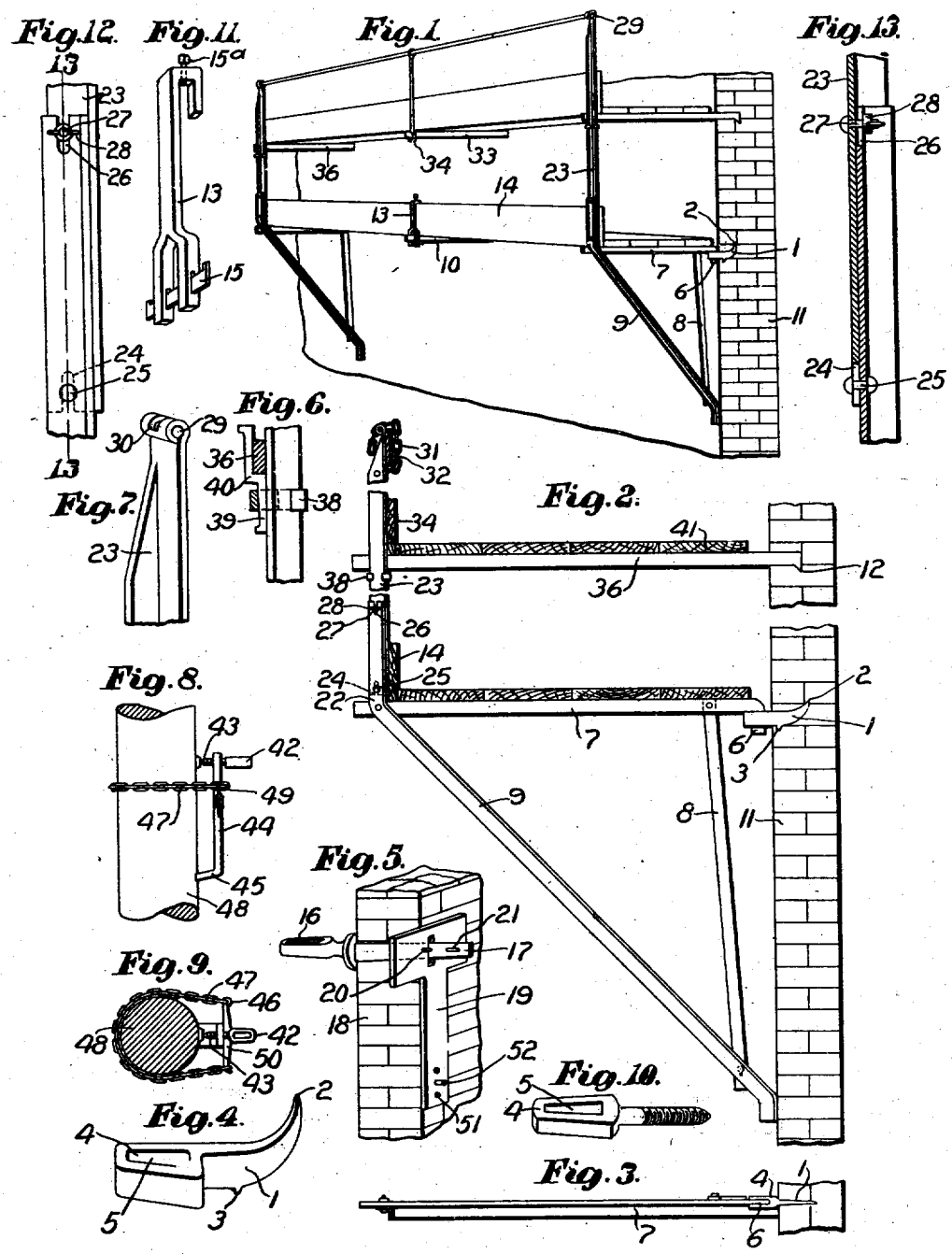
Witnesses:
Edwin T. Luce
Horace A. Crossman
Inventor:
George Edward Humphries,
by Emery & Booth.
Attys.
ANDREW B. GRAHAM CO., PHOTO-LITHOGRAPHERS, WASHINGTON, D. C.

UNITED STATES PATENT OFFICE.

GEORGE EDWARD HUMPHRIES, OF WELLINGTON, NEW ZEALAND.

SCAFFOLDING.

13,036. Specification of Reissued Letters Patent. Reissued Nov. 9, 1909.

Original No. 867,274, dated October 1, 1907, Serial No. 359,517. Application for reissue filed February 27, 1909. Serial No. 480,488.

*To all whom it may concern:*

Be it known that I, GEORGE EDWARD HUMPHRIES, a subject of His Majesty the King of Great Britain and Ireland, residing at No. 148 Adelaide road, Wellington, in the Provincial District of Wellington, in the Dominion of New Zealand, have invented certain new and useful Improvements in Scaffolding, of which the following is a specification.

My invention relates to improvements in scaffolding, and it consists in the constructions, combinations and arrangements herein described and claimed.

The object of my invention is to provide an improved scaffolding, especially adapted to brick, or masonry, walls, which can be conveniently attached in position to provide a secure and safe support for the workmen.

In the accompanying drawings, forming a part of this application, and in which similar reference symbols indicate corresponding parts in the several views,—Figure 1 is a perspective view, illustrating one embodiment of my invention; Fig. 2 is an end view, on a larger scale, of the construction shown in Fig. 1; Fig. 3 is a plan view of one of the brackets and its supporting eye; a portion of the wall engaged by said hook being shown; Fig. 4 is a top perspective view of one of the supporting eyes; Fig. 5 is a perspective view, showing a portion of a brick wall with a modified form of supporting eye secured thereto; Fig. 6 is a detail front elevation, on a larger scale, of the slidable adjustable bracket shown in Fig. 2; Fig. 7 is a detail perspective view, on a larger scale, showing the top of the side post illustrated in Fig. 2; Fig. 8 illustrates a modified construction for securing the supporting eye to a post, or upright; Fig. 9 is a plan view of the part shown in Fig. 8; Fig. 10 is a perspective view of the supporting eye shown in Fig. 8; Fig. 11 is a perspective view of the clamping bracket shown in Fig. 1; Fig. 12 is a detail side elevation, on a larger scale, clearly showing the supporting joint between the strut and the side post; and Fig. 13 is a sectional view on the line 13—13 of Fig. 12.

Referring especially to Figs. 1, 2, 3, 5, 6, 7 and 11, 4 indicates a supporting eye of a scaffold hook or anchor 1 adapted to be driven or inserted between the bricks of a masonry wall; the portion containing said eye being substantially at right angles to the face of the wall; said hook being preferably formed with a fulcrum or lug 3 on its lower face which provides anchoring or friction surfaces, and with a curved or upwardly extending inner end portion having a holding point 2. In use the hook is positioned to bring said lug to bear upon the wall at a point in from the face of the latter, thereby preventing cracking of the edge of the brick on which said hook rests and effectually protecting the face of the wall.

The aperture 5 of the supporting eye is shaped to taper outwardly from the wall, for receiving a correspondingly tapered hook 6 of a side bracket; thereby enabling the hook 6 to be firmly wedged in place by driving it outwardly in the tapered aperture, the faces of which thus restraining side swing of the bracket.

The bracket is shown comprising a floor support 7 having an inclined strut 9 secured thereto with its inner end positioned for cooperating with or engaging the masonry wall 11; a brace 8 connecting said support 7 and strut 9. The outer end of the strut 9 extends upwardly, and is provided with a notch 26 in its upper end for receiving a bolt 27 passing through a side post 23; said bolt being provided with a thumb nut 28 for tightening it in position. The lower end of the side post 23 is provided with a notch 24 adapted to receive a bolt 25 passing through the upwardly-extending portion of the strut 9. By this means, the side post can be conveniently attached securely in position by sliding it downward on the upward extension to bring the notches 24 and 26 into engagement with the corresponding bolts 25 and 27, and then tightening the thumb nut 28.

As shown especially in Figs. 2 and 6, an adjustable bracket 38 is slidably supported on the side post, and provided with a tapered opening for receiving and seating a wedge 39 against the side post to lock the bracket in any of its adjusted positions. The upper end of said wedge is offset at 40 to provide a seat for the outer end of the supporting rod or putlog bar 36; the greatest transverse dimension of said bar being vertically arranged and inner end of said rod or bar being provided with a flange or anchoring end 12 for securing it in the masonry wall, said bracket being claimed in my Patent Number 898,368, patented September 8, 1908.

Intermediate of the floor supports 7, a bar or putlog bar 10 is secured to the masonry wall in a manner similar to the bar 36; the outer end of said bar 10 extending through a yoke at the lower end of a bracket 13. The upper end of said bracket is provided with a hook for engagement over a guard board or beam 14, which latter extends between and is supported on the side brackets. A tapered cotter 15 is mounted in the yoke of the bracket 13 for wedging the bar 10 firmly in said yoke, and a screw 15[a] is threaded through the upper portion of the bracket 13 for engaging the top of the board 15 to clamp the rod 10 against said board.

A chain 31 is secured near the upper end of each side post and adapted to be latched in a slot 30 formed in the top of said post for securing a hand rail 32 to the latter. The chain 31 can be securely latched by passing a pin through an eye 29 formed at the top of the side post and through the link of the chain extending through the slot 30 into said eye. It will be obvious that instead of employing a hand rail 32, a hand rope could be secured to the eyes 29 at the top of the side posts.

I have shown in Fig. 1 an intermediate supporting rod 33 secured to the masonry wall in a manner similar to the rod 36, and secured to the hand rail 32 by a link 34.

From the above description it will be seen that the weight of the lower platform on the support 7 will tend to maintain the hooks 6 wedged in their tapered supporting eyes 5, and that the weight on the upper platform will tend to keep the wedges 39 firmly seated for locking the adjustable brackets 38.

Fig. 5 illustrates a slightly modified means for securing the supporting eye to the masonry wall. In this construction the tapered supporting eye 16 is provided with an annular flange for engaging the outer face of the wall and with a shank 17 adapted to extend through said wall and through an opening in an anchor plate 19 on the inner face of said wall. The shank 17 is provided with a series of openings 21 adapted to receive a key 20 which will engage the anchor plate to lock the shank firmly in position. The lower end of the anchor plate is provided with a series of openings 51 adapted to receive a pin 52 which can be driven between the courses of the brick wall; thereby tying down said plate to securely prevent upward tilting of the inner shank 17.

Figs. 8, 9 and 10 illustrate a modified construction for securing the supporting eye to an upright. In this construction, a clamping bar 44 is provided with an offset lower portion 45 for engaging the upright, and with a threaded opening in its upper end for receiving the threaded shank 43 of the supporting eye 42. An intermediate cross-piece 50 on the bar 44 has a chain 47 secured at one end 46 thereto; said cross-piece being provided at its other end with a hook 49 to which the chain is latched after being passed around the upright. In this construction, the bar 44 is placed in position with its offset 45 and the threaded shank 43 engaging the upright, and the chain then secured about the upright for supporting the bar in position. The threaded shank 43 is then screwed through the clamping bar 44 against the upright until sufficient pressure is exerted thereby to securely lock the parts in position.

Figs. 5, 8, 9 and 10 illustrate merely two modified means for securing the supporting eyes in position; said eyes being then employed for supporting the platforms in a manner exactly similar to that described in reference to Figs. 1 and 2.

I have illustrated and described preferred and satisfactory constructions, but, obviously, changes could be made within the spirit and scope of my invention.

Having thus described my invention, what I claim as new therein and desire to secure by Letters Patent is:—

1. A scaffold hook or anchor comprising a portion adapted to project substantially at right angles to a wall and an upwardly curved inner end portion having a holding point.

2. A scaffold hook or anchor provided at its inner end with a holding point and between the latter and the outer end of the hook with a wall face protecting fulcrum adapted to bear down upon the wall at a point in from said face.

3. In a scaffolding the combination of a scaffold hook or anchor comprising a portion adapted to project substantially at right angles to a wall and an upwardly curved inner end portion having a holding point with a bracket supported by said hook and coöperating with the wall beneath said hook.

4. In a scaffolding the combination of a scaffold hook or anchor comprising a supporting end adapted to project substantially at right angles to a wall and provided with side swing restraining faces, and an upwardly curved inner end portion having a holding point, with a bracket supported by said hook and steadied against side swing by said restraining faces.

5. In a scaffolding the combination of a scaffold hook or anchor comprising an outer portion adapted to project at right angles to a wall and having a tapered aperture therein and an upwardly curved inner end portion having a holding point with a bracket adapted for support by said hook and having a portion formed for engaging the tapered walls of said aperture.

6. A scaffolding comprising, in combination, a scaffold hook, a bracket supported thereby, a putlog bar at a different level from said bracket and supported at its outer end by the latter and having its greatest transverse dimension vertically arranged and having a substantial portion of its length formed for insertion into the mortar space of a wall.

7. A scaffolding comprising, in combination, a scaffold hook, a bracket supported thereby, a putlog bar at a different level from said bracket and supported at its outer end by said bracket, the greatest transverse dimension of said bar being vertically arranged and a substantial portion of its length being formed for insertion into the mortar space of a wall and an anchor lug on said bar for preventing longitudinal movement thereof when in its normal position.

8. A scaffolding comprising, in combination, a scaffold hook, a bracket supported thereby, a putlog bar at a different level from said bracket, a bracket supported post for supporting the outer end of said bar, the latter having its greatest transverse dimension vertically arranged and a substantial portion of its length formed for insertion into the mortar space of a wall.

9. In a scaffolding the combination of supporting eyes provided with outwardly tapered apertures, means for securing said eyes to a support, brackets provided with tapered hooks for engaging said apertures, and downwardly inclined struts on said brackets for abutting against said support, substantially as described.

10. In scaffolding, the combination of supporting eyes, means for securing said eyes to a support, brackets adapted to engage said eyes and to abut against said support, upward extensions upon said bracket provided with notches at their tops, bolts extending through the lower portions of said upward support, side posts provided with notches in their lower ends for engaging said bolts, bolts extending through said side posts in position to engage the notches in said upward extension, and means for tightening said bolts for clamping said side posts in position on said upward extensions, substantially as described.

11. In scaffolding, the combination of supporting eyes, means for securing said eyes to a support, brackets adapted to engage said eyes and to abut against said support, upward extensions on said bracket, side posts detachably secured to said upward extensions, eyes formed at the upper ends of said side posts and provided with slots extending through the walls thereof, chains secured to said side posts and adapted to be latched in said slots, and a side rail supported on said chains, substantially as described.

12. In scaffolding, the combination of brackets, means for securing them to a support, a guard board extending between and resting on said brackets, a rod secured to said support and extending beneath said guard board, a bracket hooked over said guard board and provided with a yoke for receiving said rod, a tapered key in said yoke for wedging said rod in the latter, and a screw threaded in the upper portion of said bracket for engagement with said guard board for clamping together said guard board and rod, substantially as described.

In testimony whereof, I affix my signature in the presence of two witnesses.

GEORGE EDWARD HUMPHRIES.

Witnesses:

HENRIE H. RAYWARD,
J. J. WATSON.